United States Patent [19]

Hayashi et al.

[11] Patent Number: 5,038,217
[45] Date of Patent: Aug. 6, 1991

[54] APPARATUS AND METHOD FOR EDITING STILL VIDEO AND AUDIO INFORMATION BY ERASURE

[75] Inventors: Toshitada Hayashi, Tokyo; Heihachi Ide, Kanagawa; Kohichi Sano, Tokyo, all of Japan

[73] Assignee: Sony Corporation, Tokyo, Japan

[21] Appl. No.: 377,249

[22] Filed: Jul. 10, 1989

Related U.S. Application Data

[62] Division of Ser. No. 204,394, Jun. 9, 1988.

[30] Foreign Application Priority Data

Jun. 11, 1987 [JP] Japan ................................ 62-145892
Jun. 12, 1987 [JP] Japan ................................ 62-146420

[51] Int. Cl.$^5$ .............................................. H04N 5/76
[52] U.S. Cl. .................................... 358/341; 358/342; 358/335
[58] Field of Search ............... 358/341, 342, 343, 335; 360/19.1, 32, 35.1, 15; 369/32, 59, 111, 50, 48, 49

[56] References Cited

U.S. PATENT DOCUMENTS

| | | | |
|---|---|---|---|
| 4,445,195 | 4/1984 | Yamamoto | 358/341 |
| 4,602,295 | 7/1986 | Moriyama | 358/341 |
| 4,641,204 | 2/1987 | Sugiyama | 358/342 |
| 4,660,100 | 4/1987 | Sugiyama | 358/342 |
| 4,777,537 | 10/1988 | Ueno et al. | 358/341 |
| 4,796,099 | 1/1989 | Compton | 358/342 |
| 4,802,018 | 1/1989 | Tanikawa et al. | 358/906 |
| 4,819,087 | 4/1989 | Takeuchi et al. | 360/14.3 |
| 4,829,388 | 5/1989 | Nakayama et al. | 360/35.1 |
| 4,849,832 | 7/1989 | Yanagata et al. | 360/66 |

Primary Examiner—Roy N. Envall, Jr.
Assistant Examiner—Huy Nguyen
Attorney, Agent, or Firm—Philip M. Shaw, Jr.

[57] ABSTRACT

Audio signals are recorded on recording tracks of a disk shaped recording medium in a predetermined schedule for making establishment of an associated track information table easier and allowing after recording of audio signals with respect to each video signal. In addition, selective or entire erasure of video signals and associated audio signals is automatically performed when one of the recording tracks recording one of the video signals or the associated audio signals is ordered to be erased.

10 Claims, 6 Drawing Sheets

APPARATUS AND METHOD FOR EDITING STILL VIDEO AND AUDIO INFORMATION BY ERASURE

This is a divisional of application Ser. No. 204,394, filed June 9, 1988.

BACKGROUND OF THE INVENTION

1. Field of the Invention

The present invention relates generally to an apparatus and method for recording or reproducing both video and audio signals on the same recording medium. More particularly, the invention relates to a so-called "after recording" recording technique for recording audio signals on a recording medium after video signals have been recorded, i.e. after picking up a still image and recording a video signal of the picked up still image an audio signal is recorded along with an identification of the associated video signal so that they can be reproduced synchronously. The invention also relates to an editing technique for editing recorded information including erasure of recorded information.

2. Description of the Background Art

European Patent First Publication 0 180 477, published on May 7, 1986 discloses a signal recording or reproducing apparatus for recording a video signal indicative of a still image and an audio signal. The video and audio signals are recorded on a magnetic disk having a plurality of recording tracks. In the disclosed system, each of the recording tracks records one field of video signal or 10 seconds of audio signal. The video signal and the audio signal can be recorded on a magnetic disk as the recording medium in various modes. For instance, the video signal and the audio signal can be recorded on the magnetic disk independently of each other in an independent recording mode and the audio signal can be associated with the video signal to be reproduced synchronously with reproduction of the associated video signal in an associating recording mode. In the latter mode, the audio signal to be associated with the still image can include an identification code of one of the tracks which stores the associated video signal.

The co-pending U.S. Pat. Application Ser. No. 918,514, filed on Oct. 10, 1986, now U.S. Pat. No. 4,777,537, issued Oct. 11, 1988, discloses an audio signal reproducing technique in an electronic still image recording or reproducing apparatus which records a video signal indicative of a still image and an audio signal in a manner similar to that discussed with respect to the European Patent First Publication No. 0 180 477. The invention disclosed in the above-identified U.S. Patent Application is directed to a technique for recording audio signals to be associated with one still image on a plurality of recording tracks.

In that apparatus, information regarding the order of reproduction of the audio signals on different recording tracks becomes necessary for reproducing the audio signals in a desired order. Therefore, an information signal is generated which includes information regarding the leading track number, the immediately following track number and the track number of one of the recording tracks storing the associated video signal. A table memory can be provided for storing information corresponding to that recorded with the audio signal and establishing a table showing the relationship between the information stored in the respective tracks on the magnetic disk. This table memory can allow smooth selection of the associated tracks and thus allow smooth reproduction of the video signal and associated audio signals.

In such a video and audio signal recording or reproducing apparatus, however, it would be desirable to provide the capability of editing the recorded information.

SUMMARY OF THE INVENTION

Therefore, it is an object of the invention to provide an apparatus and method for editing including erasure of audio signals in association with video signals.

Another object of the invention is to provide an editing apparatus and technique for effectively erasing unnecessary video and audio signals during the editing operation.

In order to accomplish the aforementioned and other objects, there is provided in combination with a recording medium having a plurality of mutually separated data recording regions which each store one field of video data in a first data recording region and audio data in at least one second data recording region, each of the first and second data recording regions being identified by unique identification numbers and associated with each other to be reproduced synchronously, an editing apparatus which comprises first means for selecting one of the first and second data recording regions to erase the data stored therein, second means for finding all of the first and second data recording regions storing video or audio data associated with the data stored in the selected data recording region, and third means for performing erasure for the first and second data recording regions selected by the first means and the second means.

In the preferred construction, the recording medium records a plurality of video data and audio data constituting a plurality of groups, each including video data or audio data stored in the first and the second data recording regions, and the audio data includes identification data of each group. The second means detects the identification data, selects all of the second data recording regions containing the same group identification data, and sets a marking indicative of erasure demand. The third means erases the data on the first and second data recording regions having the erasure demand indicative marking on the second data recording regions and the first data recording region associated with the second data recording regions to be erased.

The invention further comprises the method of operation of the above-described apparatus.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

In the drawings:

FIGS. 5A, 5B and 6A, 6B, 6C, and 6D are examples of audio signal recording patterns in the after recording mode operation;

DESCRIPTION OF THE PREFERRED EMBODIMENT

Figure 1:
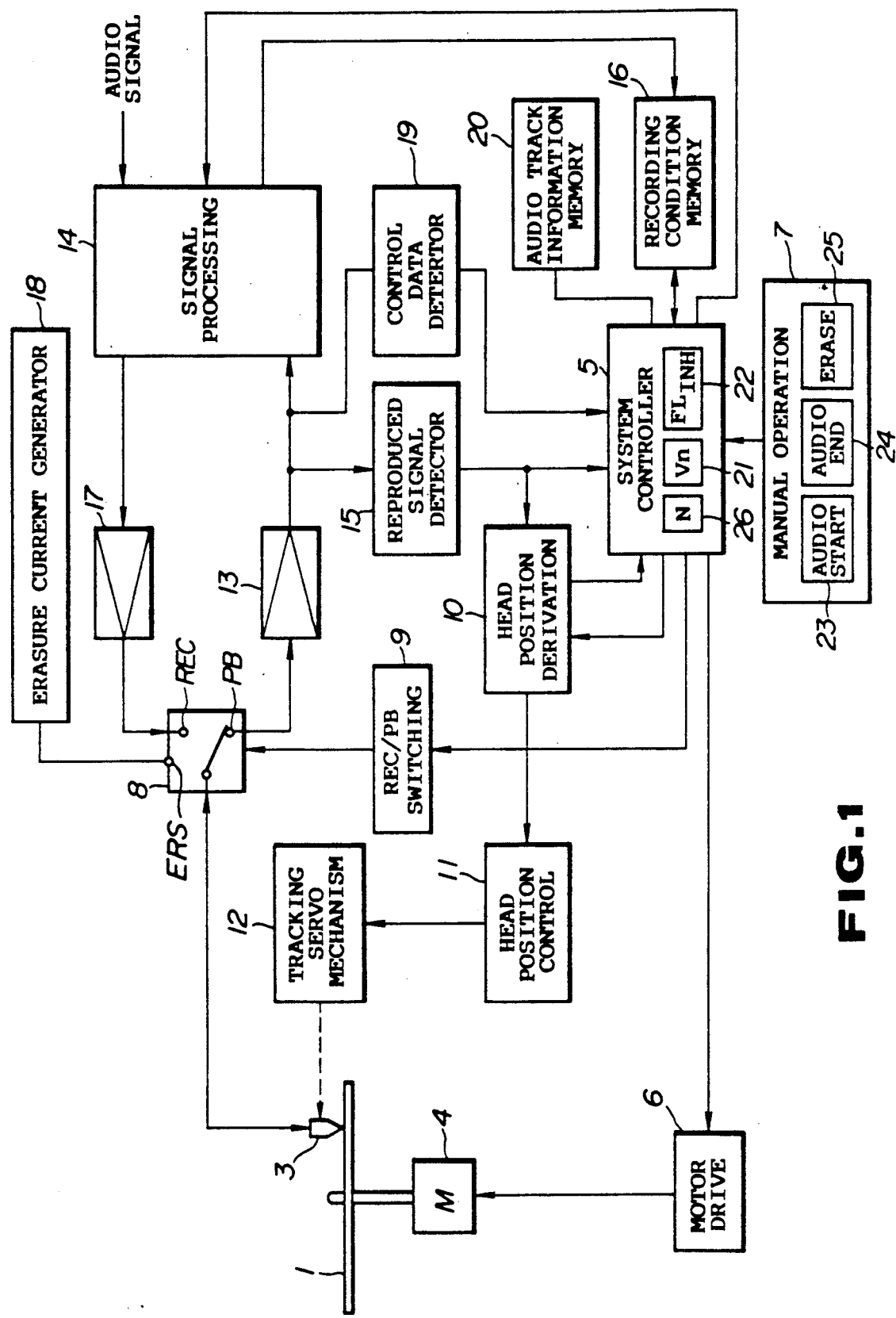
FIG. 1 is a block diagram of the preferred embodiment of an editing apparatus according to the present invention.
Figure 2:
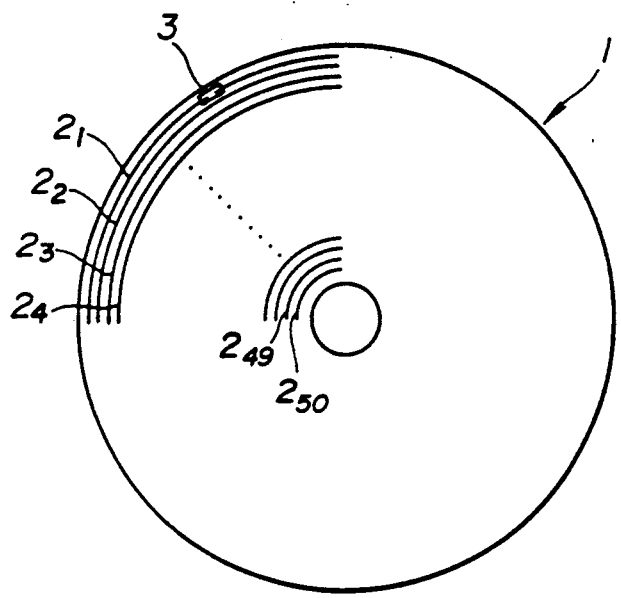
FIG. 2 is an illustration of a magnetic disk to be used in recording video and audio signals, which is applicable for the editing apparatus of FIG. 1.

Referring now to the drawings, particularly to FIGS. 1 and 2, the preferred embodiment of an editing apparatus, according to the invention, is designed for reproducing video signals and recording and reproducing audio signals. The video and audio signals are recorded on a magnetic disk 1 as a recording medium. The magnetic disk 1 is formed with a plurality of recording tracks $2_1, 2_2, 2_3, 2_4 \ldots 2_{49}, 2_{50}$, as shown in FIG. 2. In the shown embodiment there are fifty such recording tracks. In the preferred embodiment of the editing apparatus of FIG. 1, the magnetic disk 1 is chucked on a turntable (not shown) of a disk drive mechanism in opposition to a magnetic head 3 which is designed for recording and reproducing video and audio signals. The disk drive mechanism includes a disk drive motor 4 which rotates the magnetic disk 1 with the turntable. The disk drive motor 4 is connected to a motor drive control circuit 6 which is, in turn, connected to a system controller 5. It will be understood that the system controller 5 includes a microprocessor, not shown, which controls the system according to programs contained within its memory (not shown).

The system controller 5 is connected to a manually operable unit 7 for selecting the operation mode of the editing apparatus. The system controller 5 is also connected to a manually operated switching circuit 9 to allow the operator to selectively control the switch position of a mode selector switch 8 between a recording mode (hereafter "REC mode") position, a playback or reproduction mode (hereafter "PB mode") and an erase mode position. The switching circuit 8 receives a mode control signal from the system controller 5 to move the mode selector switch 8 to a REC mode position, a PB mode position or an erase mode position.

The system controller 5 is also connected to a head position derivation circuit 10. The head position derivation circuit 10 is connected to a head position control circuit 11 which controls the operation of a tracking servo mechanism 12. The tracking servo mechanism 12 initially places the magnetic head 3 at a position opposite to an outermost track $2_1$ and drives the head radially with respect to the disk 1 at a controlled magnitude as controlled by a tracking servo control signal from the head position control circuit 11. The system controller 5 outputs a tracking control signal indicative of the recording track on or from which the video or audio signal is to be recorded or reproduced, to the head position derivation circuit 10. The head position derivation circuit 10 receives the tracking control signal and derives the magnitude of the radial shift of the magnetic head 3 which is necessary to move it from the outermost track position to the selected track position. The head position derivation circuit 10 thus feeds a tracking magnitude indicative signal to the head position control circuit 11 which produces the tracking servo control signal.

The magnetic head 3 is electrically connected to the mode selector switch 8. The mode selector switch 8 has a playback terminal (hereafter "PB terminal") which is connected to the input of an audio signal processing circuit 14 via a playback amplifier 13. The mode selector switch 8 also has a recording terminal (hereafter "REC terminal") which is connected to the output of the audio signal processing circuit 14 via a recording amplifier 17. The audio signal processing circuit 14 is connected to an external audio signal source to receive therefrom an audio signal. The system controller can be programmed to set the number of consecutive data recording tracks to be left blank between tracks in which video signals are recorded.

The playback amplifier 13 is also connected to a reproduced signal detector circuit 15. The reproduced signal detector circuit 15 detects the envelop of a reproduced RF signal to produce an envelope indicative signal which is then input to the system controller 5. The envelope indicative signal is also fed to the head position derivation circuit 10. The envelop indicative signal as input to the head position derivation circuit 10 serves as a feedback signal for deriving the magnitude of the radial shift of the magnetic head 3.

In the shown embodiment, the tracking operation is performed in 10 steps per one track. The head position is precisely derived by the head position derivation circuit 10 by detecting the peak of the envelop indicative signal from the reproduced signal detecting circuit 15. The head position derivation circuit 10 outputs the head position data to the system controller 5 at the position of the magnetic head 3 where the head is precisely positioned. The system controller 5 detects the track number data where the magnetic head is placed and information reproduced from the corresponding track. Based on the detected information, the system controller 5 outputs recording condition indicative data to a recording condition memory 16. The recording condition memory 16 further records data of the video signals recorded in the field mode or the frame mode, the date and so forth. In addition, the shown embodiment of the editing apparatus is also provided with an erasure current source 18. The erasure current source is connected to the magnetic head 3 via an erase mode (hereafter "ERS mode") terminal. Therefore, the ERS mode is select ed by the mode selector switch 8 as controlled by the switching circuit 9.

Figure 3:
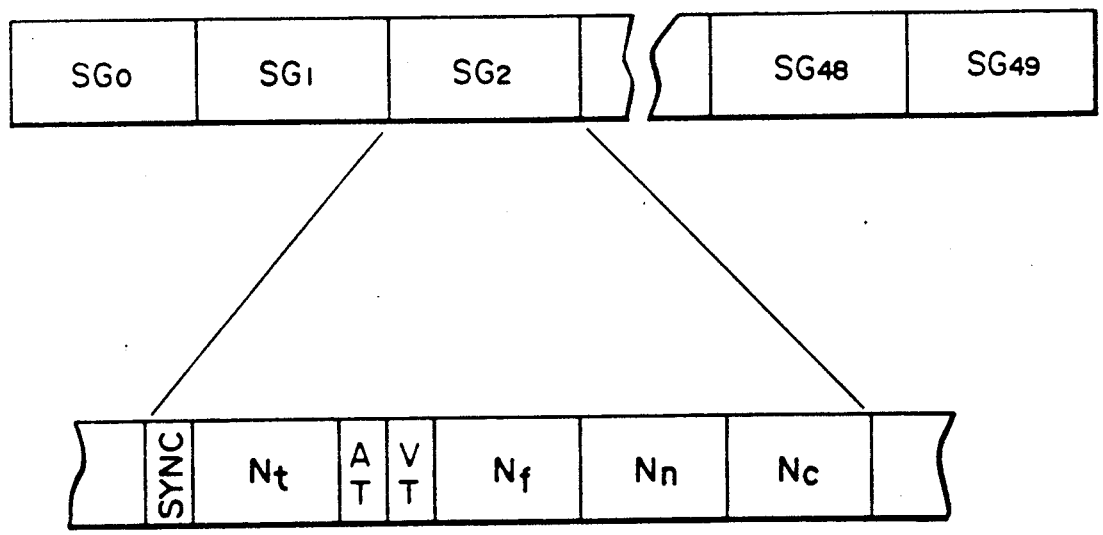
FIG. 3 is an illustration showing the data format stored in an audio track together with an audio signal.

The playback amplifier 13 is further connected to the input of an audio track control data detector circuit 19 which detects control data which includes various information in a data format illustrated in FIG. 3. As seen from FIG. 3, the control data includes a synchronization signal SYNC, a track number Nt, audio distinction data AT, and video distinction data VT. In the preferred embodiment, audio signals recorded on a plurality of tracks constitute a group to be consecutively reproduced as an audio signal sequence. Furthermore, the sole or group of audio tracks can be coupled with one of the video tracks so as to be reproduced in synchronism with reproduction of the video signal stored in the associated video track. Therefore, the control code illustrated in FIG. 3 further includes identification data of the first track of the grouped audio tracks Nf (hereafter "first track data"), of the next audio track Nn (hereafter "following track data") and of the associated video track Nc (hereafter "video track data").

The audio track control data detector circuit 19 feeds the detected control data through the system controller 5 to an audio track information memory 20. The audio track information memory 20 stores the first track data Nf, the following track data Nn and the video track data Nc in a form of a table shown below:

| Track Number Nt | Video Track Nc | First Track Nf | Following Track Nn |
|---|---|---|---|
| A11 | V1 | A11 | A12 |
| A12 | V1 | A11 | A13 |
| A13 | V1 | A11 | A13 |
| A21 | V2 | A21 | A22 |
| A22 | V2 | A21 | A23 |
| A23 | V2 | A21 | A23 |
| A31 | — | A31 | A32 |
| A32 | — | A31 | A33 |
| A33 | — | A31 | A33 |

The operation of the preferred embodiment of the editing apparatus will be discussed hereafter with reference to FIGS. 4 to 9.

At first, discussion will be given with respect to an after recording process to be performed by the editing apparatus set forth above, with reference to FIGS. 4 to 6. Before starting the after recording, the editing apparatus is operated in a reproduction mode. Therefore, the system controller 5 outputs the mode selector signal to the switching circuit 9 to cause switching of the mode selector switch B to select the PB mode position. The system controller 5 also outputs the disk drive control signal to the motor drive circuit 6 to drive the disk drive motor 4. The system controller 5 also successively outputs the head position control signal to the head position derivation circuit 10. The head position derivation circuit 10 is responsive to the head position control signal and the envelop indicative signal from the reproduced signal detecting circuit 15 to derive the magnitude of the radial shift of the magnetic head 3 to output a tracking magnitude indicative signal to the head position control circuit 11. The head position control circuit 11 outputs in response thereto a tracking servo control signal to operate the tracking servo mechanism 12. Therefore, the magnetic head 3 is driven radially across the recording tracks $2_1, 2_2 \ldots 2_{49}, 2_{50}$. During this radial scan, the magnetic head 3 is driven in the reproduction mode to reproduce signals stored in the respective recording tracks. Therefore, signals stored in all of the recording tracks $2_1, 2_2 \ldots 2_{49}, 2_{50}$ are reproduced in order. The reproduced signal detecting circuit 15 thus detects an envelop of the reproduced RF signal to input the envelop indicative signal to the system controller 5. The system controller 5 then establishes a recording condition indicative table showing the already recorded tracks and empty tracks and other associated data. The recording condition indicative table is then stored in the recording condition memory 16.

As will be seen from FIG. 5, in one example, the video signals are stored on the magnetic disk 1 with a given number of track intervals. Namely, in the shown example, the video track V2 is formed by recording a video signal while leaving three empty tracks A1, A2 and A3 between the video tracks V1 and V2, and the video track V3 is formed while leaving two empty tracks A4 and A5 between the video tracks V2 and V3. Following the video track V3, three empty tracks A6, A7 and A8 are left. The empty tracks A1, A2 ... A8 serve as audio tracks for recording audio signals during the after recording process.

After establishing the recording condition table in the recording condition memory 16, one of the video tracks V1, V2, V3 ... Vn is selected, by means of the manually operable unit 7, for performing after recording to record the audio signal. In response to this manual selection of the video track, the system controller 5 selects one of the empty tracks to be the first track of the group of audio tracks. In the shown embodiment, since the magnetic head scans from the outermost track $2_1$ to the inner most track $2_{50}$, the track to be the first audio track in the group of audio tracks to be associated with the selected video track has to be the immediately adjacent inner track with respect to the selected video track.

Under this condition, the system controller 5 outputs the mode selector signal to the switching circuit 9 to cause switching of the mode selector switch 8 to select the REC mode position.

Figure 4:
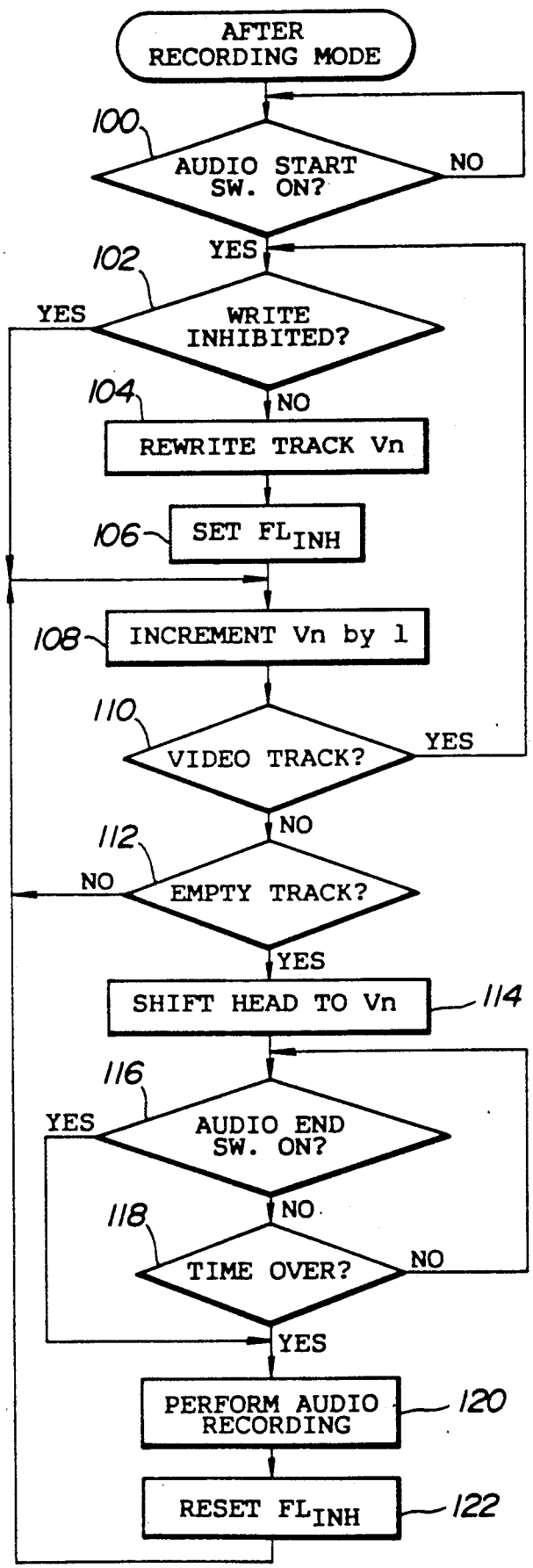
FIG. 4 is a flowchart of an after recording control program to be performed by the editing apparatus of FIG. 1.

At this point, the after recording control program of FIG. 4 is executed by the system controller 5. Beginning at a step 100, the position of an audio start switch 23 in the manually operable unit 7 is checked. After starting execution of the after recording control program, the editing apparatus is held in a stand-by state until the turning ON of the audio start switch 23 is detected at the step 100.

When the turning ON of the audio start switch is detected as checked at the step 100, a check is performed of whether the selected video track number Vn can be rewritten or not, at a step 102 by checking the condition of a rewrite inhibiting flag $FL_{INH}$ in an write inhibit flag register 22 in the system controller 5. If rewriting the selected video track number is not inhibited as checked at the step 102, the selected video track number Vn corresponding to the video track selected through the manually operable unit 7 is written in a temporary register 21 in the system controller 5, at a step 104. Then, the rewrite inhibiting flag $FL_{INH}$ is set at a step 106.

At a step 108, the track number Vn stored in the temporary register 21 is read. Based on the read track number, the track number to start audio recording is identified. In practice, since the audio recording is to be performed for the empty track or tracks oriented on the inner side of the selected video track Vn, audio recording begins with the first track of the audio track group so that the track number of the audio recording start track is determined by adding one (1) to the track number Vn of the selected video track. After setting the track number at the step 108, a check is performed whether the track of the new set number is a video track, at a step 110. If the track checked at the 110 is not a video track, a further check is performed of whether the set track is empty, at a step 112. When the set track is empty as checked at the step 112, the system controller 5 outputs the head position control signal to the head position derivation circuit 10, at a step 114. The head position derivation circuit 10 detects the instantaneous head position based on the input from the reproduced signal detector circuit 15 and derives the direction and magnitude for shifting the magnetic head 3 to produce a corresponding tracking magnitude indicative signal. The head position control circuit 11 is responsive to this tracking magnitude indicative signal to drive the tracking servo mechanism 12 to cause a radial shift in the direction and magnitude as indicated by the tracking magnitude indicative signal. After tracking is completed, the magnetic head 3 is held in a stand-by state.

Then, a check is performed of whether an audio end switch 24 is operated or not at a step 116 and whether the elapsed time exceeds a preset period of time at a step 118. The preset period of time is set for defining the maximum length of the audio signal to be recorded on one track. In order to expand the capacity for audio recording on one track, the audio signal is recorded on the track in time-base compressed form. Therefore, the signal processing circuit 14 performs time-base compression of the audio signal. As a result, the shown embodiment allows recording of 10 seconds of audio signal. In practice, the signal processing circuit 14 adds control data to be recorded with the audio signal on the audio track. The control data to be added is in the format of FIG. 3.

After expiration of the preset period of time, the system controller 5 outputs a recording control signal to make the signal processing circuit 14 output the audio signal with the control data to the magnetic head 3 via the recording amplifier 17 and the mode selector switch 8, at a step 120. After completing audio recording for the selected audio track, the write inhibit flag $FL_{INH}$ in the write inhibit flag register 22 is reset, at a step 122.

After the step 122, the process returns to the step 108 for performing audio recording on the next empty track. Therefore, the set number of the track is again incremented by one, at the step 108. Then, the newly set track is checked whether it is a video track, at the step 110. When the newly set track is not a video track, a check is further performed of whether the set track is empty or not, at the step 112. When the checked track is empty, the process proceeds to perform the steps 114 to 122 for recording the audio signal with the control data.

When the track checked at the step 110 is a video track, the process returns to the step 102. When the write inhibit flag $FL_{INH}$ is set, so that updating of the content of the temporary register 21 is inhibited as checked at the step 102, the process jumps to the step 108 to increment the track number by one.

Otherwise, the track number of the video track as detected at the step 110 is written in the temporary register 21 in place of the former track number, at a step 104. Then the process proceeds through the steps 106 to 122 for recording audio signals on audio tracks to be associated with subject video track.

In some cases, the audio signal can be recorded before performing after recording. For this track, overwriting of the audio signal should not be performed. Therefore, when the track as checked at the step 112 is not empty, the process returns to the step 108 to shift to the next inside track.

When the audio end switch 24 is turned ON before the time of the audio signal reaches the preset time, a shorter length of the audio signal can be recorded on the track by jumping the process from the step 116 to the step 120.

As will be appreciated, in the shown process for after recording, since the tracks for performing audio recording are left in blank before the after recording, the after recording operation and detection of the recording state of each track becomes simplified.

Though the aforementioned embodiment is designed for leaving empty tracks between video tracks for making the after recording operation easier, it is possible to record the video signals in consecutive tracks and leave audio recording areas constituted of a plurality of consecutive empty tracks for after recording of the audio signals, as shown in FIG. 6.

The shown embodiment of the editing apparatus according to the invention can perform a group erasure operation for erasing all of the grouped audio tracks and the associated video track by identifying one of the tracks in the grouped audio signal or associated video signal. In order to enable the group erasure operation, the system controller 5, at first, performs scanning of all of the recording tracks $2_1, 2_2, \ldots 2_{49}, 2_{50}$ for establishing the recording condition indicative table in the recording condition memory 16 and the audio track information table in the audio track information memory 20. After establishing the recording condition indicative table and the audio track information table, one of the tracks Vn upon which the erasure operation is to be performed is manually selected through the manually operable unit 7. Then, the system controller 5 operates the head position derivation circuit 10, the head position control circuit 11 and the tracking servo mechanism 12 for setting the magnetic head 3 at the selected track.

Figure 7:
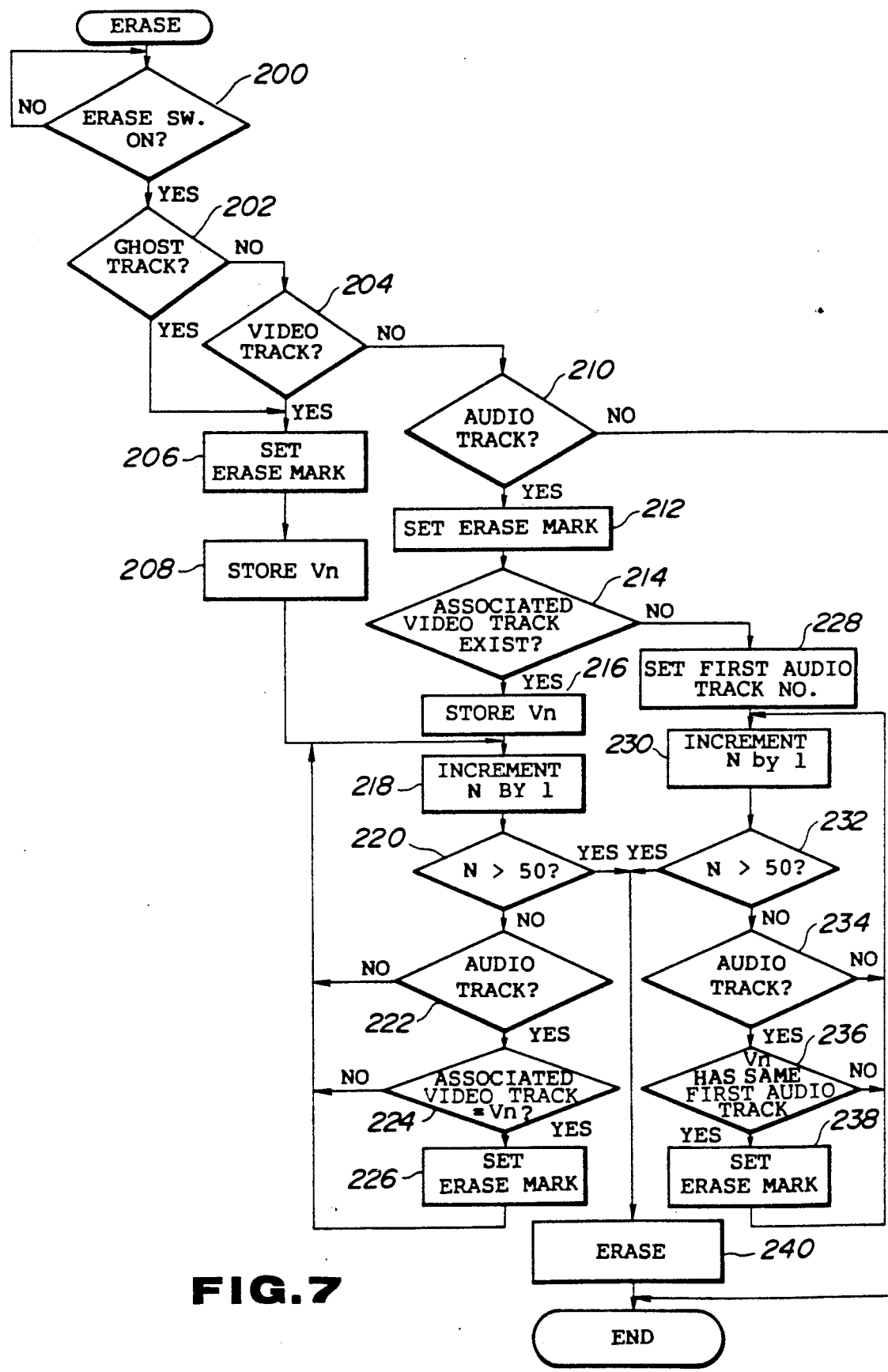
FIG. 7 is a flowchart of the erasure control program to be performed by the editing apparatus of FIG. 1.
Figure 8:
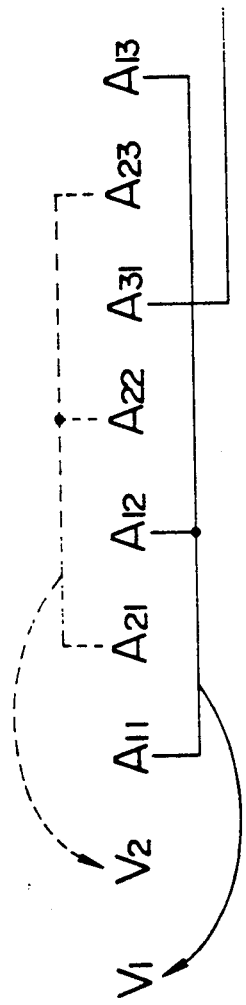
FIG. 8 is an illustration of an example of the groups of video and audio signals to be erased through execution of the erasure control program of FIG. 7.
Figure 9:
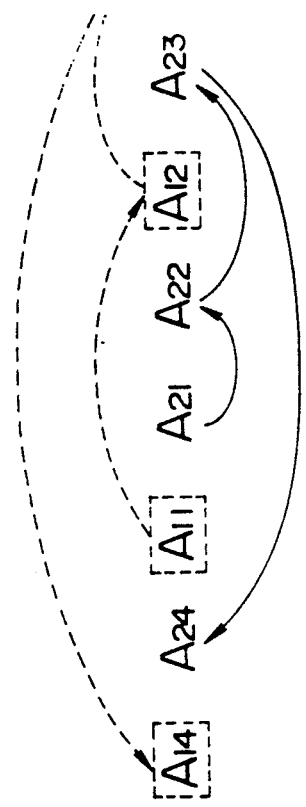
FIG. 9 is an illustration of an example of the order of the audio tracks in the audio track groups.

The process of erasing recorded data is controlled by the system controller 5 operating under an erasure control program of FIG. 7. Beginning at a step 200, the switch position of an erasure switch 25 is checked. When turning ON of the erasure switch 25 is detected as checked at the step 200, the system controller 5 outputs the mode selector control signal ordering the PB mode. In response to the PB mode control signal, the switching circuit 9 switches the mode selector switch to the PB mode position to reproduce the stored signal on the tracks. The reproduced signal is checked by the control code detector circuit 19. The control data detected by the control code detector circuit 19 is checked at a step 202. When control data is not detected with respect to the signal reproduced from the selected track, a determination is made that the selected track is a ghost track which stores some signal but the distinction between a video track and an audio track cannot be made. When the selected track is not a ghost track as checked at the step 202, a check is performed of whether the selected track is a video track, at a step 204. When the selected track is a video track as checked at the step 204 or a ghost track as checked at the step 202, an erase mark is set on the track number data in the recording condition table of the recording condition memory 16, at a step 206. Thereafter, the selected track number Vn is set in the temporary register 21 as group identification track number, at a step 208.

When the selected track is not a video track as checked at the step 204, a check is performed of whether the selected track is an audio track, at a step 210. If the selected track is not an audio track as checked at the step 210, which means that the selected track is an empty track, the process directly goes END. When the selected track as checked at the step 210 is an audio track, an erase mark is set on the track number in the recording condition indicative table of the recording condition memory 16, at a step 212. Thereafter, the audio track information data in the audio track information table in the audio track information memory 20 is checked to determine whether the audio track group including the selected track is associated with the video track, at a step 214. When an associated video track number Nc is detected as checked at the step 214, the associated video track number Nc is set in the temporary register 21 as a group identification track number Vn, at a step 216.

After setting the group identification track number at the step 208 or the step 216, a counter value N of a track number counter 26 in the system controller 5, which counter value represents the current track number, is incremented by one (1) at a step 218. This number represents the next track traveling in the radially inward direction on the recording medium 1. Then, the new counter value (N=N+1) is compared with the maximum track number value, in this example 50, at a step 220. When the track number counter value N is not greater than the maximum track number a check is performed of whether the corresponding track as represented by the track number counter value N is an audio track at a step 222. If so, the audio track information data of the corresponding audio track is checked in the audio track information table, at a step 224. At the step 224, the associated video track number Nc as derived from the audio track information table is compared with the video track number Vn stored in the temporary register 21. If the associated video track number Nc matches the video track number Vn set in the temporary register 21 as checked at the step 224, an erase mark is set on the track number of the recording condition table of the recording condition memory 16, at a step 226.

If the track identified by the track number counter value N is not an audio track as checked at the step 222 or if the associated video track number does not match the video track number set in the temporary register 21 as checked at the step 224, the process returns to the step 218.

By repeating the process through the steps 218 to 226, erase marks can be set for all of the audio tracks subsequent to the track selected by manually operable unit 7 and which are also associated with the same video track. Note that all tracks having a higher number than the track selected by the manually operable unit 7 will be checked to determine if they have the same associated video track number, in which case they will be marked for erasure. Thus even audio tracks which are not arranged consecutively with the selected track will be marked for erasure. For example, with the recording pattern shown in FIG. 6C, if the video track V2 is selected for erasure, the associated audio tracks A21 and A22 will also be marked for erasure. Likewise, if the audio track A21 is selected, the track A22 (but not the video track V2) will also be automatically marked for erasure.

Referring again to step 214, when no associated video track is found by checking the audio track information table against the selected track, the first track data Nf is read from the audio track information table at a step 228. The read first track number Nf is then set in the temporary register 21 as Vn at the step 228.

After setting the first audio track number at the step 228, a counter value N of a track number counter 26 in the system controller 5, which counter value represents the current track number, is incremented by one (1) at a step 230. Then, the track number counter value N is compared with the maximum track number value, e.g. 50, at a step 232. When the track number counter value N is not greater than the maximum track number, a check is performed of whether the corresponding track as represented by the track number counter value N is an audio track at a step 234. If so, the audio track information data of the corresponding audio track is checked in the audio track information table, at a step 236. At the step 236, the associated first audio track number is compared with the audio track number Vn stored in the temporary register 21. If the two numbers match, an erase mark is set on the track number of the recording condition table of the recording condition memory 16, at a step 238.

If the track identified by the track number counter value N is not an audio track as checked at the step 234 or if the corresponding first audio track number as read from the audio track information table does not match the audio track number set in the temporary register as checked at the step 236, the process returns to the step 230.

By repeating the process through the steps 230 to 238, erase marks can be set for all of the audio tracks associated with the first audio track set in the temporary register which are subsequent to the track selected by the manually operable unit 7.

When the track number counter value N becomes greater than the maximum track number as checked at the steps 220 or 232, the system controller 5, at step 240, produces a mode selector control signal to the switching circuit 9 to cause switching of the mode selector switch 8 to the ERS mode position. At this position, the erasure current from the erasure current source 18 is supplied to the magnetic head 3 through the mode selector switch 8. The system controller 5 also outputs the head position control signal to move the magnetic head 3 to the tracks for which the erase marks have been set in the recording condition table of the recording condition memory 16. Therefore, all of the video and audio tracks grouped to be reproduced synchronously can be erased.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the foregoing discussion has concentrated on the group erasure mode in erasing the recorded signals, it is possible to erase signals in each track independently of the other. Furthermore, if desired, only the group of audio signals associated with the video signal can be erased while maintaining the video signal.

What is claimed is:

1. An editing apparatus for use with a recording medium having a plurality of mutually separated data recording regions each being identified by a different identification number and each data recording region having recorded therein a different identification number, a group identification number for designating a group of data recording regions whose recorded data are to be reproduced synchronously, and either a field of video data or a given period of audio data, wherein the editing apparatus comprises:

first means for selecting which one of the data recording regions is to have the data recorded therein erased;

second means, operative after the completion of the selecting by the first means, for locating the data recording regions in which are recorded either video or audio data associated with the data recorded in said selected data recording region by reproducing the identification numbers and the group identification numbers of selected ones of the data recording regions, comparing the group identification numbers with the group identification number of the selected one data recording region, and selecting for erasure those data recording regions having the same group identification number as the group identification number of the selected one data recording region; and third means operatively connected to the first and second means for erasing the data from the data recording regions selected by said first means and said second means.

2. A recording and reproducing apparatus as set forth in claim 1, wherein:

said second means includes:

means for detecting which of said data recording regions in which audio data is recorded have the same group identification number as the selected one data recording region and memory means, connected to the detecting means, for storing a marking indicative of an erasure demand for each such detected data recording region, and said third means automatically erases data on said data recording regions for which an erasure demand indicative marking is stored in the memory means whereby the selected one data recording region and the data recording regions grouped to be reproduced synchronously with it are erased.

3. A recording and reproducing apparatus as set forth in claim 2, wherein said recording medium is disk shaped and has a plurality of concentrically arranged tracks serving as said data recording regions, each having a capacity for recording one field of video data representative of a still image and wherein the identification numbers correspond to the numbers of the tracks.

4. A recording and reproducing apparatus in claim 3, wherein the group identification number corresponds to the track number of a track on which video data is recorded.

5. A recording and reproducing apparatus as set forth in claim 2, wherein the recording medium has audio data recorded over a plurality of consecutive data recording regions along with a different identification number and the same group identification number in each of the consecutive data recording regions and wherein the detecting means scans the data recording regions in a radial direction beginning with the selected one of the data recording regions.

6. An editing method for use with a recording medium having a plurality of mutually separated data recording regions each being identified by a different identification number and each data recording region having recorded therein a different identification number, a group identification number for designating a group of data recording regions whose recorded data are to be reproduced synchronously, and either a field of video data or a given period of audio data, wherein the editing method comprises the steps of:

selecting which one of the data recording regions is to have the data recorded therein erased;

after the completion of the selecting step, locating the data recording regions in which are recorded either video or audio data associated with the data recorded in said selected data recording region by reproducing the identification numbers and the group identification numbers of selected ones of the data recording regions, comparing the group identification numbers with the group identification number of the selected one data recording region, and selecting for erasure those data recording regions having the same group identification number as the group identification number of the selected one data recording region; and erasing the data from the data recording regions selected by said track selecting step and said locating step.

7. An editing method as set forth in claim 6, wherein:

said locating step includes the steps of:

detecting which of said data recording regions in which audio data is recorded have the same group identification number as the selected one data recording region and storing a marking indicative of an erasure demand for each such detected data recording region, and the erasing step includes the step of automatically erasing data on said data recording regions for which an erasure demand indicative marking is stored whereby the selected one data recording region and the data recording regions group to be reproduced synchronously with it are erased.

8. An editing method as set forth in claim 7, wherein said recording medium is disk shaped and has a plurality of concentrically arranged tracks serving as said data recording regions, each having a capacity for recording one field of video data representative of a still image and wherein the identification numbers correspond to the numbers of the tracks.

9. An editing method as set forth in claim 8, wherein the group identification number corresponds to the track number of a track on which video data is recorded.

10. An editing method as set forth in claim 7, wherein the recording medium has audio data recorded over a plurality of consecutive data recording regions along with a different identification number and the same group identification number in each of the consecutive data recording regions and wherein the detecting step includes scanning the data recording regions in a radial direction beginning with the selected one of the data recording regions.

* * * * *